United States Patent

Nakanishi et al.

[11] Patent Number: 5,424,130
[45] Date of Patent: Jun. 13, 1995

[54] WATER REPELLENT GLASS AND PROCESS FOR PRODUCING THE SAME

[75] Inventors: Masatsugu Nakanishi; Syoji Yokoishi, both of Toyota, Japan

[73] Assignee: Toyota Jidosha Kabushiki Kaisha, Aichi, Japan

[21] Appl. No.: 924,572

[22] Filed: Aug. 5, 1992

Related U.S. Application Data

[63] Continuation-in-part of Ser. No. 881,791, May 12, 1992, abandoned.

[30] Foreign Application Priority Data

May 13, 1991 [JP] Japan .................................. 3-107417

[51] Int. Cl.⁶ ............................................. B32B 17/06
[52] U.S. Cl. ................................ 428/410; 428/428; 428/429; 428/447; 428/448; 428/702
[58] Field of Search ............... 428/426, 428, 432, 429, 428/410, 446, 688, 689, 697, 701, 702, 704, 447, 448

[56] References Cited

U.S. PATENT DOCUMENTS

| | | |
|---|---|---|
| 3,673,049 | 6/1972 | Giffen .................. 428/410 |
| 4,287,260 | 9/1981 | Prall ..................... 428/410 |
| 4,346,131 | 8/1982 | Yoldas .................. 428/428 |
| 4,596,745 | 6/1986 | Chao .................... 428/428 |
| 4,687,707 | 8/1987 | Matsuo .................. 428/428 |
| 4,687,707 | 12/1986 | Matsuo et al. ........... 428/336 |
| 4,847,157 | 7/1989 | Goodman ............... 428/428 |
| 4,983,459 | 1/1991 | Franz .................... 428/410 |
| 5,051,129 | 9/1991 | Cuthbert ................ 428/447 |
| 5,073,195 | 12/1991 | Cuthbert ................ 428/447 |
| 5,250,322 | 10/1993 | Takahashi .............. 428/428 |

FOREIGN PATENT DOCUMENTS

| | | |
|---|---|---|
| 83-744589 | 7/1983 | European Pat. Off. . |
| 0476510A1 | 3/1992 | European Pat. Off. . |
| 3701654A1 | 7/1987 | Germany . |
| 4218657A1 | 10/1992 | Germany . |
| 63-24554 | 10/1982 | Japan . |
| 58-172245 | 11/1983 | Japan . |
| 3-23493 | 1/1986 | Japan . |
| 2-248480 | 4/1990 | Japan . |
| 2248480 | 10/1990 | Japan . |
| 2311332 | 12/1990 | Japan . |

OTHER PUBLICATIONS

Non-Crystalline Solids, vol. 121, 1990.
Journal of Non-Crystalline Solids 121 (1990) 344,347.

*Primary Examiner*—Archene Turner
*Assistant Examiner*—Timothy M. Speer
*Attorney, Agent, or Firm*—Finnegan, Henderson, Farabow, Garrett & Dunner

[57] ABSTRACT

Disclosed are water repellent glass having an improved durability and an optimum process for producing the same. The water repellent glass includes a glass substrate, and a water repellent film coated integrally on the glass substrate and including ceramics. The ceramics includes $SiO_2$ at least, and part of nonmetallic atoms of the ceramics are substituted with a fluoroalkyl group. Hence, the water repellent film is cross-linked with the glass substrate mainly by the siloxane bonds. Consequently, the water repellent film is excellent in terms of the adhesion to the glass substrate, it is less likely to be adversely affected by the alkali components of the glass substrate, and it is less likely to come off. As a result, the water repellent glass comes to have an improved durability. This superb water repellent glass can be produced by the optimum production process including the steps of a solution preparing step of preparing a solution, a coating step of coating a paint film on a glass substrate with the solution, and a burning step of burning the paint film. The solution includes first silicone alkoxide expressed by a chemical formula $Si(OR)_4$, second silicone alkoxide, part of whose alkoxyl groups are substituted with a fluoroalkyl group, alcohol, water, and acid or base.

11 Claims, 4 Drawing Sheets

WATER REPELLENT GLASS AND PROCESS FOR PRODUCING THE SAME

This application is a continuation-in-part of application Ser. No. 07/881,791, filed May 12, 1992, now abandoned.

BACKGROUND OF THE INVENTION

1. Field of the Invention

The present invention relates to water repellent glass in which a water repellent film is formed on a surface of its glass substrate and to a process for producing the same. Water repellent glass according to the present invention can be applied to automobile windshield glass, mirror or the like.

2. Description of the Related Art

Water repellent glass has been investigated extensively in order to repel water droplets deposited on automobile windshield glass, side mirror or the like and in order to make vision area favorable during rainy weather. For example, it is possible to think of making glass itself water repellent. At present, however, such an idea has not been put to practical application yet, because there are many problems to be solved technically. Accordingly, many have come to think of forming a water repellent transparent film on a surface of a glass substrate. There have been a variety of proposals on this idea.

For instance, there has been proposed water repellent glass which has a resin film made of silicone resin, such as polydimethylsiloxane or the like, on a surface of its glass substrate. Since the silicone resin has a very favorable water repellency, this water repellent glass has an excellent water repellency.

Moreover, in Journal of Non-Crystalline Solids 121 (1990) 344–347, there is set forth a process for forming a water repellent film which comprises fluorine-including $ZrO_2$ on a steel plate. The water repellent film is made from a reaction product of a trace amount of trimethoxyfluoroalkylsilane and ZTO (zirconium tetraoctylate).

In the water repellent glass having the silicone resin film, however, the water repellent film is insufficient in terms of a weather resistance, and it offers a short life when it is put to practical application. It has been found that the cause of this drawback results from the following mechanism. Namely, the silicone resin film allows water to transmit through itself. Accordingly, water transmits through the water repellent film, and it reaches the glass substrate, thereby solving the alkaline components contained in the glass substrate out. In addition, it is hard to say that the silicone resin has a favorable resistance against alkali. As a result, the silicone resin is hydrolyzed by the alkaline components, thereby deteriorating the water repellency.

Figure 4:
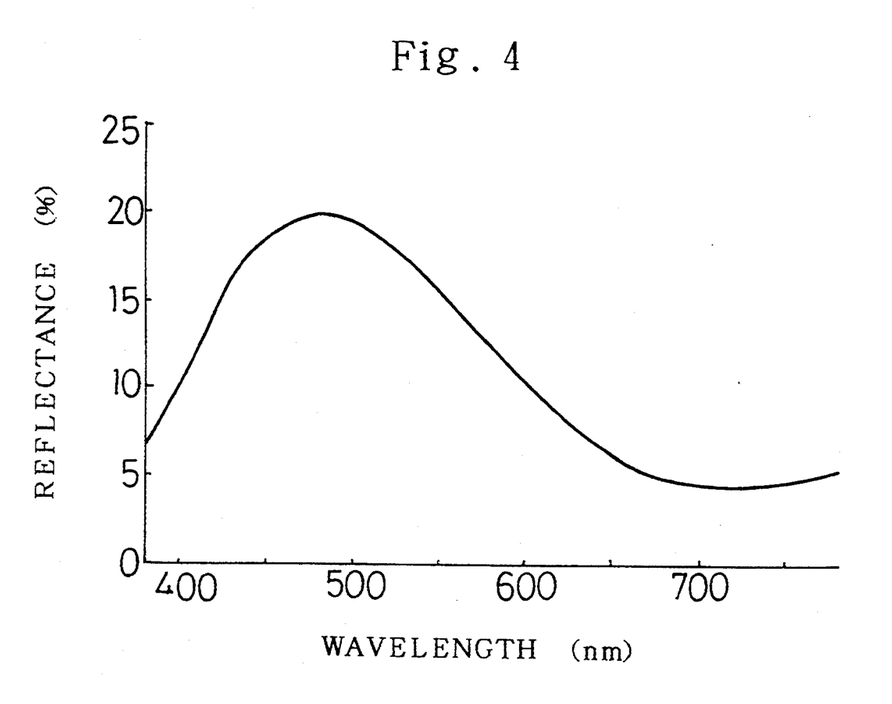
FIG. 4 is a reflection spectrum which is exhibited by glass with the conventional metal application water repellent film formed thereon.

Moreover, although the water repellent film comprising the fluorine-including $ZrO_2$ has a water repellency, it provides less affinity for glass and accordingly it is likely to come off when it is formed on a glass substrate. In addition, the fluorine-including $ZrO_2$ has an extremely high refractive index as high as 1.9 approximately. Consequently, when a thin film made of the fluorine-including $ZrO_2$ is formed on a glass substrate, the reflection lights are colored by the light interference. Therefore, the water repellent glass having the fluorine-including $ZrO_2$ water repellent film is not appropriate for automobile application. For instance, when the fluorine-including $ZrO_2$ water repellent film is formed on a soda-lime glass surface in a film thickness of 180 nm, there arises a reflection spectrum as illustrated in FIG. 4.

SUMMARY OF THE INVENTION

The present invention has been developed in view of the foregoing circumstances. It is therefore an object of the present invention to improve a water repellent film in terms of alkali resistance so that it can sustain the water repellency for a long period of time, and so that it is enhanced in terms of the adhesion to a glass substrate.

The above and other objects are achieved by water repellent glass according to the present invention which comprises:

a glass substrate; and a water repellent film coated integrally on a surface of the glass substrate and including ceramics including $SiO_2$ at least, part of nonmetallic atoms of the ceramics being substituted with a fluoroalkyl group.

Glass to be used for the glass substrate is not limited specifically. The glass can be selected from the group consisting of silicate glass such as silica glass, silica-alkali glass, lead-alkali glass, soda-lime glass, potassium-lime glass, barium glass or the like, borosilicate glass including $B_2O_3$ and $SiO_2$, phosphate glass including $P_2O_5$, or the like.

One of the major features of the present invention lies in the water repellent film. The water repellent film is formed of ceramics including $SiO_2$ at least, and part of nonmetallic atoms of the ceramics are substituted with a fluoroalkyl group. Here, the ceramics including $SiO_2$ means that it includes $SiO_2$ in an amount of 50% by mole or more. It is not preferable that the ceramics includes $SiO_2$ less than 50% by mole, because the adhesion of the water repellent film to the glass substrate deteriorates and there arise interference colors. As the component of the water repellent film other than $SiO_2$, it can be selected from the group consisting of various ceramics like $TiO_2$, $Al_2O_3$, $ZrO_2$ and so on. Since these ceramics or metallic oxides have a refractive index higher than that of $SiO_2$, a refractive index of the water repellent film can be adjusted by coexisting these ceramics with $SiO_2$. Accordingly, it is possible to get rid of the light interference so as to make the reflection lights colorless. In addition, the inclusion of $TiO_2$ and $ZrO_2$ results in the improvement of the water corrosion resistance of the water repellent film as well as the life extension thereof.

The nonmetallic atoms of the ceramics generally specify oxygen elements, but they can be the other nonmetallic atoms. Part of the nonmetallic atoms are substituted with a fluoroalkyl group. It is preferable to substitute the nonmetallic atoms with the fluoroalkyl group in an amount of less than 1.5% of a total number of all the nonmetallic atoms. With this substitution, it is possible to coexist the water repellency of the water repellent film with the hardness thereof. When the nonmetallic atoms are substituted with the fluoroalkyl group in an amount of 1.5% or more of a total number of all the nonmetallic atoms, the hardness of the water repellent film deteriorates and accordingly it is impossible to put the water repellent glass to actual application. In particular, when the nonmetallic atoms are substituted with the fluoroalkyl group in an amount of 0.75% or less of a total number of all the nonmetallic atoms, the water repellent film comes to have an excellent hardness.

When the nonmetallic atoms are substituted with the fluroalkyl group in an amount of less than 0.1%, the obtained water repellent films have the contact angle with respect to water being less than 80° and owing to this contact angle, the water repellent glass can't exhibit its advantage.

In the case where the film thickness of the produced water repellent films is about 50 nm (in the case of a rather thin film) if the nonmetallic atoms are substituted with the fluoroalkyl group in an amount of more than 1.5%, the hardness of water repellent film deteriorates and the abrasion arises when the film hardness is evaluated by a wear test using a Taber abraser. Accordingly, it is necessary that the nonmetallic atoms should be substituted with the fluoroalkyl group in an amount of 1.5% or less of a total number of all the nonmetallic atoms.

Furthermore, when the water repellent glass is applied to automobile glass, the water repellent films of it should exhibit the haze value increments ($\Delta H$) are 2 or less ($\Delta H \leq 2$ is the value in accordance with JIS.). In this case, it is necessary that the nonmetallic atoms are substituted with the fluoroalkyl group in an amount of less than 0.75% of a total number of all the nonmetallic atoms. So considering the substitution limit where the water repellency of the water repellent film is obtained, the nonmetallic atoms are advisable to be substituted with the fluoroalkyl group in an amount of 0.1% or more and less than 0.75% of a total number of all the nonmetallic atoms, when the water repellent glass for automobile is produced.

Moreover, it is preferable that the water repellent film further includes phosphorous elements. If such is the case, the phosphorous elements trap the alkaline ions in the glass substrate, thereby inhibiting the alkaline ions from diffusing through the water repellent film to a surface thereof. Thus, the inclusion of phosphorus element results in a further extension of the life of the water repellent film.

A process according to the present invention for producing the above-described water repellent glass comprises the steps of:

a solution preparing step of preparing a solution in which first silicone alkoxide expressed by a chemical formula $Si(OR)_4$, second silicone alkoxide, part of alkoxyl groups of the second silicone alkoxide being substituted with a fluoroalkyl group, alcohol, water, and acid or base are mixed;

a coating step of coating the solution on a surface of a glass substrate, thereby forming a paint film; and a burning step of burning the paint film, thereby forming a water repellent film.

As for an amount of the second silicone alkoxide, it is preferable to include the second silicone alkoxide in the solution in an amount of less than 3% by mole of a total amount of all the alkoxides when silicone alkoxide is employed for all the alkoxides. With this second silicone alkoxide inclusion, the water repellency and the hardness can be coexisted in the water repellent film as described earlier. Here, it is further preferable to include the second silicone alkoxide in the solution in an amount of 1.5% by mole or less of a total amount of all the alkoxides when silicone alkoxide is employed for all the alkoxides.

Further, in the solution preparing step, it is preferable to include metallic alkoxide such as titanium alkoxide, zirconium alkoxide, aluminum alkoxide or the like in an amount of 50% by mole or less of an amount of the silicone alkoxide. With this metallic alkoxide inclusion, it is possible to adjust the refractive index of the water repellent film as described above.

Furthermore, in the solution preparing step, it is preferable to further mix phosphorus alkoxide in the solution in an amount of 20% by mole or less of a total amount of all the alkoxides. With this phosphorus alkoxide inclusion, the alkaline substances can be inhibited from diffusing through the water repellent film as described earlier. Thus, the life of the water repellent film can be further extended.

The coating step can be carried out by any known means like dipping, spin coating, spraying and so on.

The burning step is a step which is adapted for burning the paint film so as to form the water repellent film. Before the burning step, a drying step is usually carried out so as to remove the water, the solvent or the like. When carrying out this burning step in air, it is preferable to carry out the burning step at 350° C. or less. When the burning step is carried out at a temperature of more than 350° C., the fluoroalkyl group decomposes, thereby deteriorating the water repellency. Further, when carrying out this burning step in non-oxidizing atmosphere, the paint film can be burnt at a temperature of not more than 600° C. approximately at which the glass substrate melts. Furthermore, when the paint film is burnt at a temperature as high as possible, the silanol groups in the paint film are more likely to change into the siloxane bonds so as to form a glass-like structure, thereby improving the adhesion of the water repellent film to the glass substrate and enhancing the hardness thereof as well.

In addition, in the burning step, it is preferable to introduce a trace amount of water vapor into the atmosphere. With this water vapor introduction, the hydrolysis of unreacted alkoxides is facilitated and accordingly it is possible to form a further densified and much harder water repellent film. Moreover, it is preferable to carry out the burning step in the presence of ammonium gas. With the ammonium gas presence, $SiO_2$ is oxynitrided partially, thereby further improving the hardness of the water repellent film. Here, it is further preferable to regulate the thickness of the water repellent film to 100 nm or less. When the thickness of the water repellent film exceeds 100 nm, the scratch resistance of the water repellent film comes to deteriorate.

In the process according to the present invention for producing the water repellent glass, the silicone alkoxides are hydrolyzed so as to generate hydroxides having the silanol group in the solution preparing step or the burning step. Then, the hydroxides react with each other, or they react with the glass substrate, and accordingly the formation of the siloxane bonds is facilitated, thereby forming a dense and highly hard film. Since this film further includes the fluoroalkyl group in itself, it operates as a water repellent film.

Hence, in the water repellent glass according to the present invention, the water repellent film is cross-linked with the glass substrate mainly by the siloxane bonds. As a result, the water repellent film is excellent in terms of the adhesion to the glass substrate, and it is inhibited from coming off the glass substrate. Further, the water repellent film has not only the high hardness but also an excellent wear resistance. Furthermore, when compared with the conventional silicone resin film, the water repellent glass exhibits a less water transmittance but a higher alkali resistance. Therefore, the water repellent film is less likely to be adversely affected by the alkali components in the glass substrate, and consequently it is improved in terms of the durability.

Moreover, when the metallic elements such as Ti, Zr or the like coexist in the water repellent film, the refractive index of the water repellent film can be approximated to the refractive of the glass substrate. Accordingly, it is possible to inhibit the light interference between the water repellent film and the glass substrate from occurring.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 8 is graph illustrating a relationship between the substituted amount of the fluoroalkyl group of a total number of all the nonmetallic atoms and the contact angle with respect to water, the relationship which is obtained in the Tenth Preferred Embodiment.

FIG. 9 is a graph illustrating a relationship between the substituted amount of the fluoroalkyl group of a total number of all the nonmetallic atoms and the haze value increments, the relationship which obtained in the Tenth Preferred Embodiment.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

Figure 1:
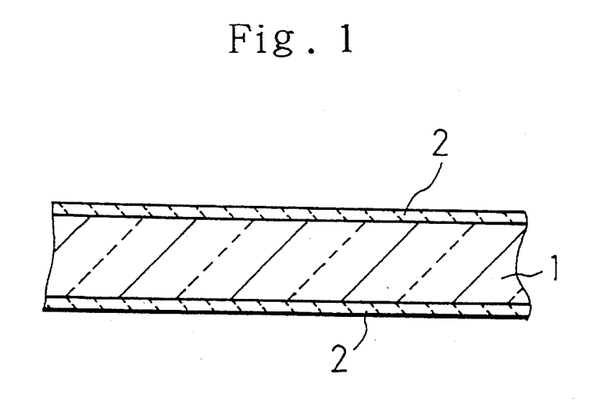
FIG. 1 is a schematic cross sectional view of water repellent glass according to the present invention.

In the following description of the preferred embodiment, there are provided descriptions on production processes for water repellent glass according to the present invention and on constructions thereof. As illustrated in FIG. 1, the water repellent glass comprises a glass substrate 1, and water repellent films 2, 2 formed on the both surfaces of the glass substrate 1.

First Preferred Embodiment (1) Solution Preparing Step

The following raw materials were stirred and mixed in a 1-liter beaker for 20 minutes:

200 g of tetraethoxysilane;
5.46 g of fluoroalkylsilane,
i.e., $CF_3(CF_2)_7CH_2CH_2Si(OCH_3)_3$; and
426.5 g of ethanol.

Further, the following extra raw materials were added to and mixed with the resulting first mixed solution:

83 g of water; and
104 g of 0.1N hydrochloric acid aqueous solution.

The thus obtained second mixed solution was stirred for 2 hours. Then, this second mixed solution was kept in a sealed container, and it was left at 25° C. for 24 hours, thereby obtaining a coating solution.

(2) Coating Step

A soda-lime glass substrate 1 was immersed into the resulting coating solution, and it was pulled up at a pulling speed of 30 mm/min., thereby forming wet paint films.

(3) Burning Step

The glass substrate 1 having the thus formed wet paint films was exposed to a temperature of 120° C. for 20 minutes in order to dry ethanol and water. Then, the glass substrate 1 was burnt in air at 250° C. for 1 hour, thereby forming water repellent films 2, 2.

(4) Tests

Figure 2:
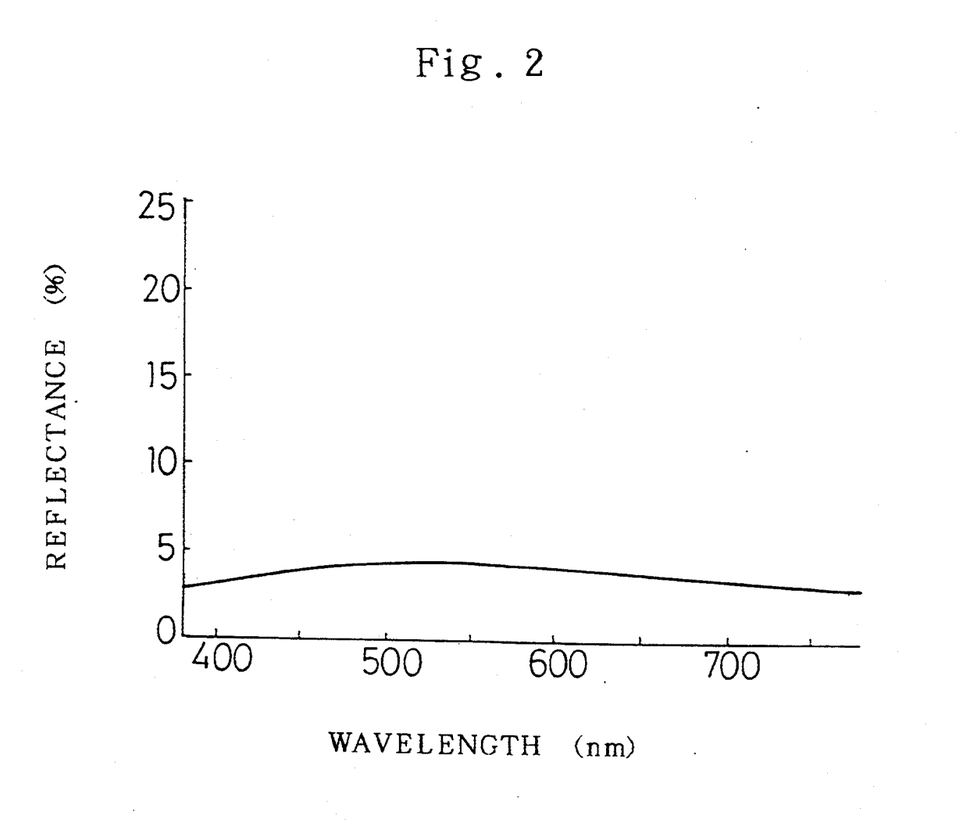
FIG. 2 is a reflection spectrum which is exhibited by a First Preferred Embodiment of water repellent glass according to the present invention.

The thus produced water repellent glass was tested on a film thickness of its water repellent films 2, 2, a contact angle with respect to water, an adhesion of the water repellent films 2, 2 to its glass substrate 1, a film hardness of the water repellent films 2, 2, a refractive index of the water repellent films 2, 2, and a weather resistance of the water repellent films 2, 2. The results of these tests are set forth in TABLE 1, and the reflection spectrum exhibited by this water repellent glass is illustrated in FIG. 2. The adhesion and the film hardness were evaluated by measuring an increment of a haze value (in %). The haze value was measured after a wear test using a Taber abraser in accordance with JIS R3212. The weather resistance was evaluated by measuring the contact angle with respect to water after an accelerated weather resistance test was carried out. The accelerated weather resistance was carried out with a sun-shine weatherometer under a at 63° C. for 4000 hours while spraying water onto the water repellent glass.

(5) Evaluation

This water repellent glass exhibited a favorable water repellency, and the adhesion of the water repellent films 2, 2 to the glass substrate 1 as well as the film hardness thereof were satisfactory. In addition, the water repellent films 2, 2 exhibited the contact angle of 90° with respect to water even after the accelerated weather resistance test. On the other hand, the conventional silicone resin water repellent film exhibited the contact angle with respect to water which degraded to 80° after the same accelerated weather resistance test. Hence, it is readily understood that the water repellent glass of the First Preferred Embodiment was superior also in terms of the weather resistance. However, since the refractive index of the water repellent films 2, 2 was slightly lower than that of the glass substrate 1, the reflection spectrum was curved slightly like a low hill, and the reflection lights were colored a bit.

Second Preferred Embodiment (1) Solution Preparing Step

The following raw materials were stirred and mixed in a 1-liter beaker for 20 minutes:
208 g of tetraethoxysilane;
5.95 g of fluoroalkylsilane,
i.e., $CF_3(CF_2)_7CH_2CH_2Si(OCH_3)_3$; and
426.5 g of ethanol.

Further, the following extra raw materials were added to and mixed with the resulting first mixed solution:
83 g of water; and
104 g of 0.1N hydrochloric acid aqueous solution.

The thus obtained second mixed solution was stirred for 2 hours. Then, this second mixed solution was kept in a sealed container, and it was left at 25° C. for 24 hours. Thereafter, the following extra raw materials were further added to the second mixed solution:
30.6 g of tetranormalbutoxytitanium,
i.e., $Ti(O\ n\text{-}Bu)_4$; and
38.5 g of ethanol.
(Here, "n-Bu" stands for "$CH_3CH_2CH_2CH_2\text{-}$.")

The resulting third mixed solution was stirred for 1 hour, thereby obtaining a coating solution.

(2) Coating Step

A soda-lime glass substrate 1 was immersed into the resulting coating solution, and it was pulled up at a pulling speed of 30 mm/min., thereby forming wet paint films.

(3) Burning Step

The glass substrate 1 having the thus formed wet paint films was exposed to a temperature of 120° C. for 20 minutes in order to dry water, ethanol and n-butylalcohol. Then, the glass substrate 1 was burnt in air at 250° C. for 1 hour, thereby forming water repellent films 2, 2.

(4) Tests

Figure 3:
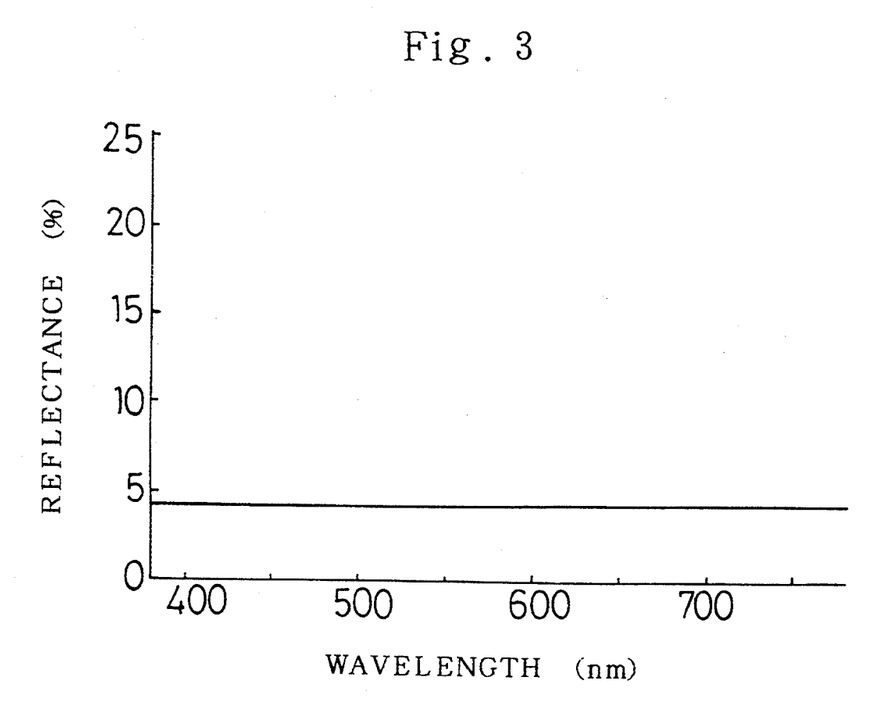
FIG. 3 is a reflection spectrum which is exhibited by a Second Preferred Embodiment of water repellent glass according to the present invention.

The thus produced water repellent glass was tested on its properties in the same manner as described in the "First Preferred Embodiment" section. The results of the tests are set forth in TABLE 1, and the reflection spectrum exhibited by this water repellent glass is illustrated in FIG. 3.

(5) Evaluation

In this water repellent glass, the refractive of the water repellent films 2, 2 was 1.52. The refractive index was higher than that of the First Preferred Embodiment, and it was substantially equal to that of the glass substrate 1. As a result, there arose no peak in the reflection spectrum at all, and the reflection lights were almost colorless. It is apparent that these favorable features resulted from the inclusion of $TiO_2$ molecules in the water repellent films 2, 2.

Third Preferred Embodiment (1) Solution Preparing Step

The following raw materials were stirred and mixed in a 1-liter beaker for 20 minutes:
208 g of tetraethoxysilane;
5.95 g of fluoroalkylsilane,
i.e., $CF_3(CF_2)_7CH_2CH_2Si(OCH_3)_3$; and
426.5 g of ethanol.

Further, the following extra raw materials were added to and mixed with the resulting first mixed solution:
83 g of water; and
104 g of 0.1N hydrochloric acid aqueous solution.

The thus obtained second mixed solution was stirred for 2 hours. Then, this second mixed solution was kept in a sealed container, and it was left at 25° C. for 24 hours. Thereafter, the following extra raw materials were further added to the second mixed solution:
30.6 g of tetranormalbutoxytitanium,
i.e., $Ti(O\ n\text{-}Bu)_4$;
9.1 g of phosphorus alkoxide, i.e., $PO(OC_2H_5)$; and
60 g of ethanol.
(Here, "n-Bu" stands for "$CH_3CH_2CH_2CH_2\text{-}$.")

The resulting third mixed solution was stirred for 1 hour, thereby obtaining a coating solution.

(2) Coating Step

A soda-lime glass substrate 1 was immersed into the resulting coating solution, and it was pulled up at a pulling speed of 30 mm/min., thereby forming wet paint films.

(3) Burning Step

The glass substrate 1 having the thus formed wet paint films was exposed to a temperature of 120° C. for 20 minutes in order to dry water, ethanol and n-butylalcohol. Then, the glass substrate 1 was burnt in air at 250° C. for 1 hour, thereby forming water repellent films 2, 2.

(4) Tests

The thus produced water repellent glass was tested on its properties in the same manner as described in the "First Preferred Embodiment" section. The results of the tests are set forth in TABLE 1.

(5) Evaluation

In this water repellent glass, the refractive index of the water repellent films 2, 2 was 1.52, and it was equal to that of the Second Preferred Embodiment. The contact angle with respect to water was 100° even after the accelerated weather resistance test, and it was superior to those of the First and Second Preferred Embodiments. It is apparent that this improvement resulted from the addition of phosphorus alkoxide. Namely, the weather resistance was improved by introducing the phosphorus elements into the water repellent films 2, 2.

Fourth Preferred Embodiment

The same solution was employed which was prepared in a manner similar to that of the First Preferred Embodiment, and the wet paint films were formed on a soda-lime glass substrate 1 also in a manner similar to it. After drying the wet paint film likewise, the wet paint films were burnt at 250° C. for 1 hour while introducing air which was saturated with water vapor at a flow of 500 c.c./min., thereby forming water repellent films 2, 2. The air was saturated with water vapor by bubbling in pure water. The thus produced water repellent glass was tested on its properties in the same manner as described in the "First Preferred Embodiment" section. The results of the tests are set forth in TABLE 1.

As can be seen from TABLE 1, the water repellent films 2, 2 of this Fourth Preferred Embodiment was improved with respect to that of the First Preferred Embodiment in terms of the adhesion and the film hardness. It is believed as follows. The hydrolysis reaction of the unreacted alkoxides was developed by introducing the water vapor during the burning, and accordingly the densification of the water repellent films 2, 2 was facilitated so that the wear resistance was improved.

Fifth Preferred Embodiment

The same solution was employed which was prepared in a manner similar to that of the First Preferred Embodiment, and the wet paint films were formed on a soda-lime glass substrate 1 also in a manner similar to it. After drying the wet paint film likewise, the wet paint films were burnt at 250° C. for 1 hour while introducing ammonium at a flow of 100 c.c./min., thereby forming water repellent films 2, 2. The thus produced water repellent glass was tested on its properties in the same manner as described in the "First Preferred Embodiment" section. The results of the tests are set forth in TABLE 1.

As can be seen from TABLE 1, the water repellent films 2, 2 of this Fifth Preferred Embodiment were remarkably improved with respect to that of the First Preferred Embodiment in terms of the adhesion. It is believed as follows. $SiO_2$ was partially oxynitrided by introducing the ammonium gas during the burning, and accordingly the water repellent films 2, 2 were cured so that the wear resistance was improved.

Sixth Preferred Embodiment

The same solution was employed which was prepared in a manner similar to that of the First Preferred Embodiment, and the wet paint films were formed on a soda-lime glass substrate 1 also in a manner similar to it. Then, inside of an oven was once evacuated to vacuum, for instance, to 1 Pa, and thereafter the atmosphere therein was substituted with an argon gas completely. Finally, the wet paint films were burnt at 500° C. for 1 hour, thereby forming water repellent films 2, 2. The thus produced water repellent glass was tested on its properties in the same manner as described in the "First Preferred Embodiment" section. The results of the tests are set forth in TABLE 1.

As can be seen from TABLE 1, the water repellent films 2, 2 of this Sixth Preferred Embodiment was improved with respect to that of the First Preferred Embodiment in terms of the adhesion and the film hardness. It is believed as follows. Since the burning step is carried out in the inert gas atmosphere, there occurred no oxidation reaction at all which resulted in the separation of the fluoroalkyl groups from the wet paint films. Hence, the burning could be carried out at the high temperature (500° C.), thereby densifying the water repellent films 2, 2.

Seventh Preferred Embodiment

The same solution was employed which was prepared in a manner similar to that of the First Preferred Embodiment, and the wet paint films were formed on a soda-lime glass substrate 1 also in a manner similar to it. Then, the glass substrate 1 was burnt at 500° C. for 1 hour in vacuum, for instance, at a vacuum degree of 1 Pa, thereby forming water repellent films 2, 2. The thus produced water repellent glass was tested on its properties in the same manner as described in the "First Preferred Embodiment" section. The results of the tests are set forth in TABLE 1.

As can be seen from TABLE 1, the water repellent films 2, 2 of this Seventh Preferred Embodiment was improved with respect to that of the First Preferred Embodiment in terms of the adhesion and the film hardness. It is believed as follows. Since the burning step is carried out in vacuum, there occurred no oxidation reaction at all which resulted in the separation of the fluoroalkyl groups from the wet paint films. Hence, the burning could be carried out at the high temperature (500° C.), thereby densifying the water repellent films 2, 2.

TABLE 1

|  | Film thickness (nm) | Contact Angle (°) | Haze Value Increment (%) | Refractive Index | Contact Angle after Weather Resistance Test (°) |
| --- | --- | --- | --- | --- | --- |
| 1st P. E. | 180 | 110 | 3 | 1.45 | 90 |
| 2nd P. E. | 180 | 110 | 3 | 1.52 | 90 |
| 3rd P. E. | 180 | 110 | 3 | 1.52 | 100 |
| 4th P. E. | 180 | 110 | 2 | 1.45 | 90 |
| 5th P. E. | 180 | 110 | 1.5 | 1.45 | 90 |
| 6th P. E. | 160 | 110 | 2 | 1.45 | 90 |
| 7th P. E. | 160 | 110 | 2 | 1.45 | 90 |

Eighth Preferred Embodiment (1) Solution Preparing Step

The following raw materials were stirred and mixed in a 1-liter beaker for 20 minutes:

200 g of tetraethoxysilane;

5.46 g of fluoroalkylsilane, i.e., $CF_3(CF_2)_7CH_2CH_2Si(OCH_3)_3$; and 1700 g of ethanol.

Further, the following extra raw materials were added to and mixed with the resulting first mixed solution:

83 g of water; and 104 g of 0.1N hydrochloric acid aqueous solution.

The thus obtained second mixed solution was stirred for 5 days. Then, this second mixed solution was kept in a sealed container, and it was left at 25° C. for 24 hours, thereby obtaining a coating solution.

(2) Coating Step

A soda-lime glass substrate 1 was immersed into the resulting coating solution, and it was pulled up at pulling speeds of 20 to 500 mm/min., thereby forming wet paint films.

(3) Burning Step

The glass substrates 1 having the thus formed wet paint films were burnt in air at 250° C. for 1 hour, thereby forming water repellent films 2, 2.

Ninth Preferred Embodiment (1) Solution Preparing Step

The following raw materials were stirred and mixed in a 1-liter beaker for 20 minutes:

200 g of tetraethoxysilane;

5.46 g of fluoroalkylsilane, i.e., $CF_3(CF_2)_7CH_2CH_2Si(OCH_3)_3$; and 450 g of ethanol.

Further, the following extra raw materials were added to and mixed with the resulting first mixed solution:

83 g of water; and 104 g of 0.1N hydrochloric acid aqueous solution.

The thus obtained second mixed solution was stirred for 5 days. Then, this second mixed solution was kept in a sealed container, and it was left at 25° C. for 24 hours, thereby obtaining a coating solution.

(2) Coating Step

A soda-lime glass substrate 1 was immersed into the resulting coating solution, and it was pulled up at pulling speeds of 5 to 40 mm/min., thereby forming wet paint films.

(3) Burning Step

The glass substrates 1 having the thus formed wet paint films were burnt in air at 250° C. for 1 hour, thereby forming water repellent films 2, 2.

Figure 5:
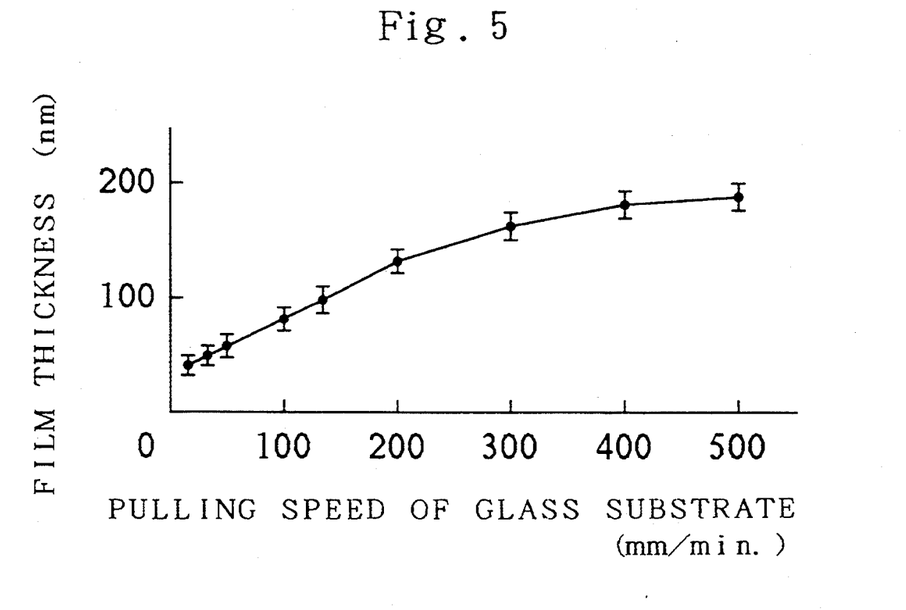
FIG. 5 is a graph illustrating a relationship between pulling speeds of glass substrates and thicknesses of water repellent films which is obtained in an Eighth Preferred Embodiment of water repellent glasses according to the present invention.
Figure 6:
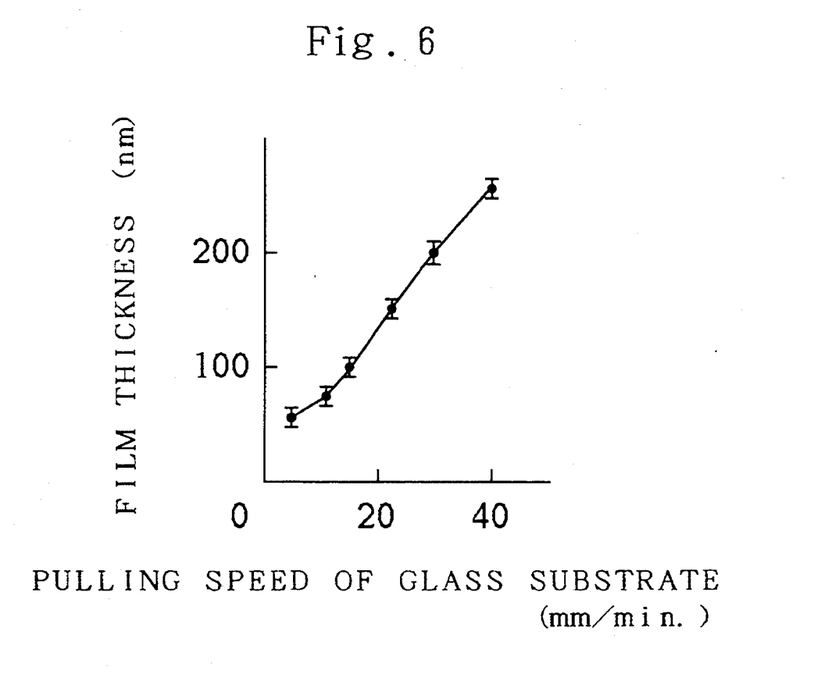
FIG. 6 is a graph illustrating a relationship between pulling speeds of glass substrates and thicknesses of water repellent films which is obtained in a Ninth Preferred Embodiment of water repellent glasses according to the present invention.
Figure 7:
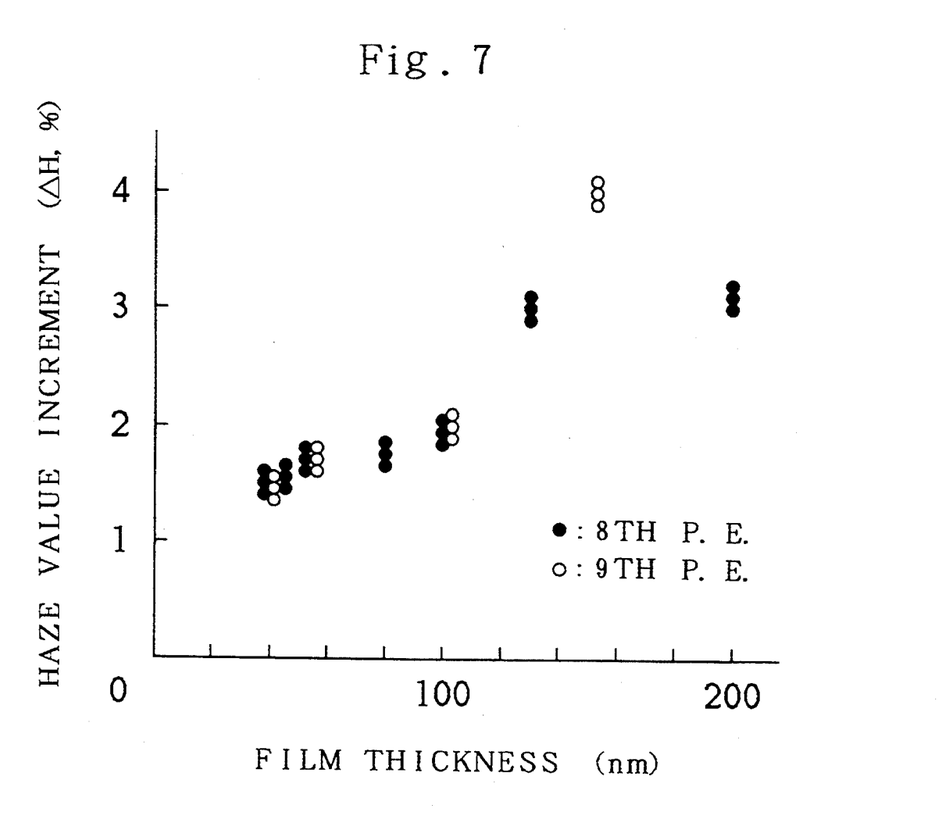
FIG. 7 is a graphic representation illustrating relationships between thicknesses of water repellent films and haze value increments ($\Delta H$) caused by a wear test using a Taber abraser, relationships which are obtained in the Eighth and Ninth Preferred Embodiments.

The thus produced water repellent glasses of the Eighth and Ninth Preferred Embodiments were tested on their film thicknesses of their water repellent films 2, 2 and their contact angles with respect to water, and they were also subjected to the wear resistance test using a Taber abraser in accordance with JIS R3212. The results of these tests are illustrated in FIGS. 5 through 7.

In the Eighth and Ninth Preferred Embodiments, all of these water repellent glasses exhibited the contact angle of 110° with respect to water regardless of the thicknesses of their water repellent films. Further, the following fact is understood from FIGS. 5 and 6: The faster the pulling speed of the glass substrate 1 is, the thicker the thickness of the water repellent film becomes. Furthermore, as can be seen from FIG. 7, when the thicknesses of the water repellent films exceeded 100 nm, the water repellent films exhibited the haze value increments ($\Delta H$) which exceeded 2% regardless of the ethanol concentrations in the coating solutions for producing the water repellent glasses in the Eighth and Ninth Preferred Embodiments. Thus, it is understood that the scratch resistance of the water repellent films deteriorated when the thicknesses of the water repellent films exceeded 100 nm.

Tenth Preferred Embodiment

The same solution was employed which was prepared in a manner similar to that of the First Preferred Embodiment except for variations in the quantity of fluoroalkylsilane. Water repellent glasses were prepared from each of the solution in the similar manner as described in the First Preferred Embodiment. The film thickness of their water repellent films is 50 nm.

The thus produced water repellent glasses were tested on contact angles with respect to water in the same manner as described in the First Preferred Embodiment. The results of the tests are set forth in FIG. 8. The thus produced water repellent glasses were also subjected to the wear resistance test using a Taber Abraser in the same manner as described in the First Preferred Embodiment. The adhesion of the water repellent films to their glass substrates and the film hardness of the water repellent films were evaluated by measuring the haze value increments ($\Delta H$, %,). The results of these tests are set forth in FIG. 9.

As can be seen from FIG. 8, when the nonmetallic atoms are substituted with the fluoroalkyl group in an amount of 0.1% or more of a total number of all the nonmetallic atoms, the contact angle of 80° or more with respect to water can be obtained. The contact angle of 80° is the minimum angle where the water repellent glass has its advantage.

Also as can be seen from FIG. 9, when the nonmetallic atoms are substituted with the fluoroalkyl group in an amount of less than 0.75%, the water repellent glass satisfied that the haze value increments ($\Delta H$) are 2 or less ($\Delta H \leq 2$) is the value in accordance with JIS as automobile glasses) and no abrasion is found. Accordingly, including the result of FIG. 8, it is clear that the nonmetallic atoms are most appropriate to be substituted with the fluoroalkyl group in an amount of 0.1% or more and less than 0.75% of a total number of all the nonmetallic atoms.

Having now fully described the present invention, it will be apparent to one of ordinary skill in the art that many changes and modifications can be made thereto without departing from the spirit or scope of the present invention as set forth herein including the appended claims.

What is claimed is:

1. Water repellent glass, comprising:
a glass substrate; and
a water repellent film coated integrally on a surface of said glass substrate, said film comprising one or more metal oxides including at least 50 mole % $SiO_2$ and wherein from 0.1% to less than 1.5% of the nonmetallic atoms of the metal oxide are substituted with a fluoroalkyl group and said film has a contact angle with respect to water of not less than 80°.

2. The water repellent glass according to claim 1, wherein said glass substrate includes at least one selected from the group consisting of silicate glass, borosilicate glass and phosphate glass.

3. The water repellent glass according to claim 2, wherein said silicate glass is at least one selected from the group consisting of silica-alkali glass, lead-alkali glass, soda-lime glass, potassium-lime glass, and barium glass.

4. The water repellent glass according to claim 1, wherein said water repellent film further includes at least one selected from the group consisting of $TiO_2$, $Al_2O_3$, and $ZrO_2$.

5. The water repellent glass according to claim 1, wherein said water repellent film further includes phosphorous.

6. The water repellent glass according to claim 1, wherein the refractive index of said glass substrate is substantially equal to the refractive index of said water repellent film so as to inhibit the occurrence of light interference between the water repellent film and the glass substrate.

7. The water repellent glass of claim 1, wherein said nonmetallic atoms are substituted by a fluoroalkyl group in an amount of 0.1% to 0.75% of the total of said nonmetallic atoms.

8. The water repellent glass of claim 7, wherein said amount of substitution is from 0.5% to 0.75%.

9. The water repellent glass of claim 1, wherein the contact angle of the water repellent film with respect to water is at least 100°.

10. The water repellent glass of claim 1, wherein the contact angle of the water repellent film with respect to water is at least 110°.

11. The water repellent glass of claim 1, wherein said film has a thickness of not more than 100 nm.

* * * * *